(12) United States Patent
Kitagawa et al.

(10) Patent No.: US 10,065,461 B2
(45) Date of Patent: Sep. 4, 2018

(54) TIRE VALVE REGISTRATION SYSTEM (71) Applicant: KABUSHIKI KAISHA TOKAI RIKA DENKI SEISAKUSHO, Aichi (JP)

(72) Inventors: Kei Kitagawa, Aichi (JP); Katsuhide Kumagai, Aichi (JP); Yasuhiro Shibata, Aichi (JP); Masayuki Oya, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 145 days.

(21) Appl. No.: 15/105,911

(22) PCT Filed: Dec. 23, 2014

(86) PCT No.: PCT/JP2014/084012
§ 371 (c)(1),
(2) Date: Jun. 17, 2016

(87) PCT Pub. No.: WO2015/098900
PCT Pub. Date: Jul. 2, 2015

(65) Prior Publication Data
US 2017/0028797 A1    Feb. 2, 2017

(30) Foreign Application Priority Data
Dec. 26, 2013  (JP) ................................. 2013-269574

(51) Int. Cl.
*G01L 17/00* (2006.01)
*B60C 23/04* (2006.01)
(Continued)

(52) U.S. Cl.
CPC ...... *B60C 23/0488* (2013.01); *B60C 23/0415* (2013.01); *B60C 23/0435* (2013.01);
(Continued)

(58) Field of Classification Search
CPC ............ B60C 23/0435; B60C 23/0416; B60C 23/0489; B60C 23/0488; B60C 23/0415;
(Continued)

(56) References Cited

U.S. PATENT DOCUMENTS 5,612,671 A * 3/1997 Mendez ............... B60C 23/0416
200/61.25
7,916,010 B2 * 3/2011 McQuade ........... B60C 23/0415
340/442

(Continued)

FOREIGN PATENT DOCUMENTS

CN    102862450 A    1/2013
CN    103029537 A    4/2013
(Continued)

OTHER PUBLICATIONS

Search Report issued in PCT/JP2014/084012, dated Apr. 7, 2015.
(Continued)

*Primary Examiner* — Randy Gibson
*Assistant Examiner* — Gedeon M Kidanu
(74) *Attorney, Agent, or Firm* — Greenblum & Bernstein, P.L.C.

(57) ABSTRACT

A tire valve registration system including: a plurality of tire valves that are respectively installed on a plurality of tires and on a spare tire and that each transmit a radio signal that includes a valve ID and data on tire air pressure; and a receiver that is provided to a vehicle body and that is capable of receiving the radio signal from each of the plurality of tire valves. The system includes: a spare tire ID collecting unit that collects, as at least one spare tire candidate ID, the valve ID of at least one radio signal received by the receiver; and a spare tire ID confirming unit that confirms the ID of the spare tire.

14 Claims, 7 Drawing Sheets

(51) Int. Cl.
*G01M 17/013* (2006.01)
*G01M 17/02* (2006.01)

(52) U.S. Cl.
CPC ......... *G01L 17/005* (2013.01); *G01M 17/013* (2013.01); *G01M 17/02* (2013.01)

(58) Field of Classification Search
CPC . B60C 23/0447; B60C 23/061; B60C 23/062; B60C 23/0457; B60C 23/0459; B60C 23/0466; B60C 23/0471; B60C 23/0486; G01L 17/005; B60G 2800/984; B60T 2240/06; B60T 2240/07; B60T 2240/08; G01M 17/013; G01M 17/02
See application file for complete search history.

(56) References Cited

U.S. PATENT DOCUMENTS

| | | | | |
|---|---|---|---|---|
| 8,436,724 | B2* | 5/2013 | Hannon | B60C 23/0416 340/445 |
| 9,322,744 | B2* | 4/2016 | Shima | B60C 23/0416 |
| 2004/0044450 | A1* | 3/2004 | Taguchi | B60C 23/0416 701/29.6 |
| 2005/0001716 | A1* | 1/2005 | Yamashita | B60C 23/0416 340/442 |
| 2005/0017860 | A1* | 1/2005 | Tsuji | B60C 23/0416 340/442 |
| 2005/0275517 | A1* | 12/2005 | Tsukamoto | B60C 23/0408 340/442 |
| 2006/0001533 | A1* | 1/2006 | Bessho | B60C 23/0416 340/442 |
| 2006/0012469 | A1* | 1/2006 | Hirai | B60C 23/0416 340/445 |
| 2010/0148949 | A1* | 6/2010 | McQuade | B60C 23/0416 340/442 |
| 2010/0300192 | A1* | 12/2010 | Isomura | B60C 23/0408 73/146.3 |
| 2010/0302063 | A1* | 12/2010 | Isomura | B60C 23/0408 340/870.16 |
| 2011/0169627 | A1 | 7/2011 | Fink | |
| 2011/0304454 | A1* | 12/2011 | Lickfelt | B60C 23/0418 340/447 |
| 2012/0203425 | A1* | 8/2012 | Shibagaki | B60C 23/0415 701/36 |
| 2013/0054079 | A1* | 2/2013 | Shibata | B60C 23/0472 701/29.2 |
| 2013/0076500 | A1 | 3/2013 | Yu et al. | |
| 2014/0088816 | A1* | 3/2014 | Shima | B60C 23/0416 701/29.1 |

FOREIGN PATENT DOCUMENTS

| | | |
|---|---|---|
| CN | 203228599 U | 10/2013 |
| JP | 2005-349958 | 12/2005 |
| JP | 2006-015955 | 1/2006 |
| JP | 2006-021716 | 1/2006 |
| JP | 2011-527971 | 11/2011 |
| JP | 2012-218672 | 11/2012 |

OTHER PUBLICATIONS

International Preliminary Report on Patentability in PCT/JP2014/084012, dated Jun. 28, 2016.
Office Action in Chinese Application No. 201480068842.9, dated Mar. 2, 2017, and English language translation.

* cited by examiner

| vehicle body | tire valve | |
|---|---|---|
| vehicle speed information Sv | traveling determination still determination | traveling determination still determination |
| Vr2~ | × | ○ |
| ~Vr1 | × | ◺ |

(Vr1 < Vr2)

| | candidate flag | candidate flag |
|---|---|---|
| ○ | yes | ON |
| × | yes | OFF |
| ◺ | no | — |

TIRE VALVE REGISTRATION SYSTEM

TECHNICAL FIELD

The present invention relates to a tire valve ID registration system that registers the ID of a tire valve as the ID of a tire of an associated vehicle to a receiver.

BACKGROUND ART

A tire air pressure monitoring system that functions as a tire valve ID registration system is known in the art. The tire valve ID registration system automatically registers the ID of a tire valve (valve ID) to a receiver as the ID of a tire of an associated vehicle without using a trigger generation device such as an initiator. (e.g., refer to patent document 1). By eliminating the need for an initiator to register the valve ID to the receiver, the number of components installed in the vehicle may be reduced.

PRIOR ART DOCUMENT

Patent Document

Patent Document 1: Japanese National Phase Laid-Open Patent Publication No. 2011-527971

SUMMARY OF THE INVENTION

Problems that are to be Solved by the Invention

Patent document 1 only describes how the IDs of the travel tires are specified and does not refer to the registration of the ID of a spare tire.

It is an object of the present invention to provide a tire valve ID registration system that easily registers the ID of a spare tire to a receiver without using a registration tool.

Means for Solving the Problem

One aspect of the present invention is a tire valve ID registration system that includes a plurality of tire valves respectively coupled to a plurality of tires and a spare tire and configured to transmit a radio signal including tire air pressure data and a valve ID, and a receiver arranged on a vehicle body and configured to receive the radio signal from each of the tire valves. The tire valve ID registration system monitors air pressure of a plurality of tires based on a radio signal transmitted from each of the tire valves and registers the valve IDs of the tire valves to the receiver. The tire valve ID registration system includes a spare tire ID collection unit and a spare tire ID designation unit. The spare tire ID collection unit is configured to collect the valve ID of at least one radio signal received by the receiver under a condition that allows for determination that the radio signal was transmitted from the tire valve of the spare tire as at least one candidate ID for the spare tire. The spare tire ID designation unit is configured to designate an ID of the spare tire by determining whether or not the receiver is able to successively receive the at least one candidate ID for the spare tire, which has been collected by the spare tire ID collection unit, under the condition and narrowing down the at least one candidate ID for the spare tire based on the determination result.

In the above configuration, preferably, the condition includes the tire valve transmitting a radio signal including still information when a vehicle is traveling at a speed that enables the tire valves to determine that the vehicle is traveling.

In the above configuration, preferably, the radio signal includes vehicle state information related to rotation of the tire corresponding to the radio signal. The spare tire ID collection unit selects at least one candidate ID for the spare tire from the valve ID of at least one radio signal received by the receiver based on a speed of the vehicle and vehicle state information of at least one radio signal received by the receiver.

In the above configuration, preferably, the vehicle state information includes one of movement information, which indicates that the tire corresponding to the vehicle state information is rotating, and still information, which indicates that the tire corresponding to the vehicle state information is still.

In the above configuration, preferably, the spare tire ID collection unit determines whether or not the vehicle is traveling at a predetermined speed or higher. When determining that the vehicle is traveling at the predetermined speed or higher, the spare tire ID collection unit sets the valve ID of a radio signal including the vehicle state information of the still information to the at least one candidate ID for the spare tire.

In the above configuration, preferably, each of the tire valves includes a gravity detection unit that detects a gravitational acceleration in accordance with rotation of the tire corresponding to the tire valve. Each of the tire valves determines whether or not the tire corresponding to the tire valve is rotating in accordance with the gravitational acceleration detected by the gravity detection unit.

In the above configuration, preferably, the predetermined speed is a speed that enables each of the tire valves to determine whether or not the tire is rotating.

In the above configuration, preferably, the spare tire ID designation unit designates the ID of the spare tire by determining whether or not candidate IDs for the spare tire can be received again under the condition in a phase having a certain duration and repeats the operation in phase units until the candidate IDs for the spare tire are narrowed down to a necessary number.

In the above configuration, preferably, the spare tire ID designation unit determines whether or not the ID of the designated spare tire has been successively received after an ignition switch of the vehicle is switched ON from OFF. When determining that the ID of the designated spare tire has been successively received, the spare tire ID designation unit formally designates the ID of the spare tire. When determining that the ID of the designated spare tire has not been successively received, the spare tire ID designation unit discards the ID of the spare tire.

In the above configuration, preferably, when designation of the ID of the spare tire cannot be terminated within a limited time, the spare tire ID designation unit forcibly terminates operation for designating the ID of the spare tire.

In the above configuration, preferably, the receiver includes a memory that holds a collected valve ID as a candidate for the ID of the spare tire. When receiving a valve ID, which is held in the memory as the candidate for the ID of the spare tire, in a radio signal that does not satisfy the condition, the spare tire ID collection unit eliminates the valve ID from the candidate for the ID of the spare tire.

Preferably, the above configuration further includes a travel tire ID collection unit and a travel tire ID designation unit. The travel tire ID collection unit receives valve IDs respectively transmitted from the tire valves and collects candidates for an ID of a travel tire. The travel tire ID designation unit specifies the ID of the travel tire by determining whether or not the collected candidates for the ID of the travel tire can be successively received and narrowing down the valve IDs based on the determination result. Operation for specifying the ID of the travel tire and operation for specifying the ID of the spare tire are synchronously performed.

In the above configuration, preferably, even after the ID of the travel tire has been designated, the spare tire ID designation unit continues to narrow down the ID for the spare tire until the ID of the spare tire is specified.

In the above configuration, preferably, when specification of the ID of the travel tire cannot be terminated within a limited time, the travel tire ID designation unit forcibly terminates the specification of the ID of the travel tire. When the travel tire ID designation unit forcibly terminates the specification of the ID of the travel tire, the spare tire ID designation unit forcibly terminates the operation for specifying the ID of the spare tire.

Effect of the Invention

The present invention allows for easy registration of the ID of a spare tire to a receiver without using a registration tool.

EMBODIMENTS OF THE INVENTION

One embodiment of a tire valve ID registration system will now be described with reference to FIGS. 1 to 9.

Figure 1:
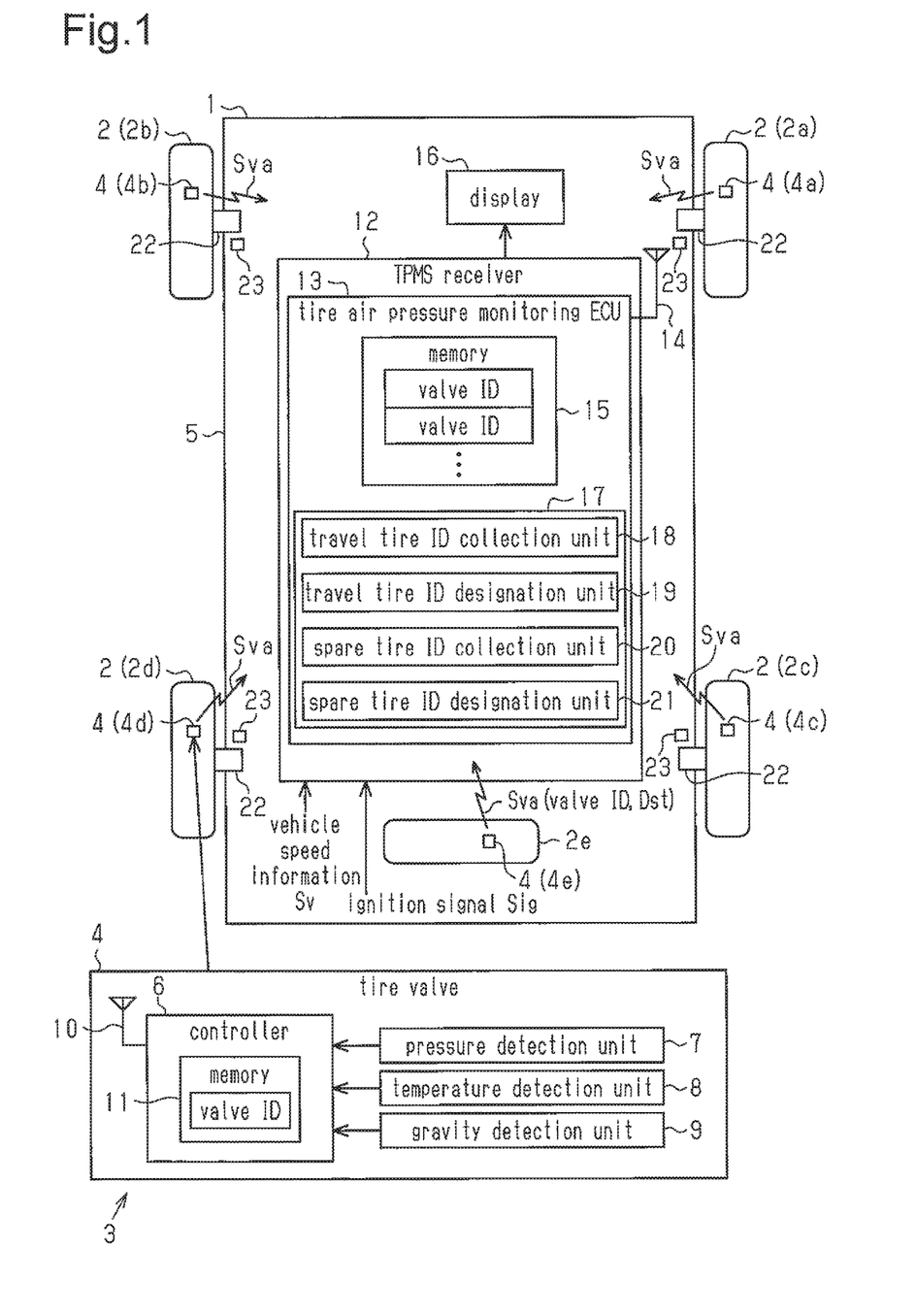
FIG. 1 is a diagram showing one embodiment of a tire valve ID registration system.

As shown in FIG. 1, a vehicle 1 includes a tire air pressure monitoring system 3 (TPMS: tire pressure monitoring system) that monitors air pressure of tires 2 (2a to 2d) or the like. The tire air pressure monitoring system 3 includes tire valves 4 (4a to 4d) coupled to the corresponding tires 2. Each tire valve 4 is a tire valve sensor in which a tire plug is provided with a sensor and a communication function. The tire air pressure monitoring system 3 transmits radio signals Sva (valve radio signals) each of which includes at least pressure data and ID of the corresponding tire 2 from the tire valves 4 to a vehicle body 5. The vehicle body 5 monitors the air pressure of the tires 2a to 2d.

Each tire valve 4 includes a controller 6, which controls operation of the tire valve 4, a pressure detection unit 7, which detects tire air pressure, a temperature detection unit 8, which detects a temperature of the tire 2, a gravity detection unit 9, which detects gravity generated in the tire valve 4, and a transmission antenna 10, which allows the tire valve 4 to transmit a radio signal. The controller 6 includes a memory 11 to which the valve ID is written and stored as the ID that is unique to the corresponding tire valve 4. The pressure detection unit 7 is preferably, for example, a pressure sensor. The temperature detection unit 8 is preferably, for example, a temperature sensor. The gravity detection unit 9 is preferably, an acceleration sensor (G sensor). The transmission antenna 10 preferably transmits, for example, a radio signal in an ultra high frequency (UHF) band.

The vehicle body 5 includes a receiver (hereafter, referred to as TPMS receiver 12) that monitors air pressure of each tire 2 by receiving the radio signal Sva from each tire valve 4. The TPMS receiver 12 includes a tire air pressure monitoring electronic control unit (ECU) 13, which controls operation of the TPMS receiver 12, and a reception antenna 14, which allows the TPMS receiver 12 to receive radio signals. The tire air pressure monitoring ECU 13 includes a memory 15 to which the valve ID obtained from each tire valve 4 is written and stored. The TPMS receiver 12 is connected to a display 16 that shows the monitoring result of the air pressure. The display 16 is preferably included, for example, in an instrument panel inside the vehicle.

When receiving a radio signal Sva from each of the tire valves 4a to 4d at a particular timing through the reception antenna 14, the TPMS receiver 12 verifies the valve ID included in the radio signal Sva. When the valve ID is verified, the TPMS receiver 12 determines the pressure data (air pressure data) included in the radio signal Sva. When the air pressure is less than or equal to a low pressure threshold value, the TPMS receiver 12 indicates, on the display 16, that the tire air pressure is low. The TPMS receiver 12 performs the tire air pressure determination on each received radio signal Sva and sequentially monitors the air pressure of the tires 2a to 2d.

The tire air pressure monitoring ECU 13 includes a tire valve ID registration function (tire valve ID registration system 17) that automatically registers the valve ID of each tire valve 4 as the ID of a tire of the associated vehicle to the TPMS receiver 12. The tire valve ID registration system 17 is capable of registering the valve IDs of travel tires (in present example, tires 2a to 2d) and the valve ID of a spare tire 2e (tire valve 4e) loaded in the vehicle to the TPMS receiver 12 without using a predetermined tool. The tire valve ID registration system 17 simply registers only the valve IDs to the TPMS receiver 12 without identifying installation positions of the tires 2a to 2e, which are tires of the associated vehicle. The travel tires refer to tires that are coupled to axles 22 of the vehicle body 5 and rotated when the vehicle travels.

The tire valve ID registration system 17 preferably includes a travel tire ID collection unit 18 that collects candidates of IDs of the travel tires (travel tire IDs) by receiving the valve IDs from the tire valves 4a to 4d of the travel tires. The travel tire ID collection unit 18 is preferably included, for example, in the tire air pressure monitoring ECU 13. The travel tire ID collection unit 18, for example, sets a certain period and collects valve IDs that are received in the set predetermined time as candidate IDs.

The tire valve ID registration system 17 preferably includes a travel tire ID designation unit 19 that designates the IDs of the travel tires that are to be registered by determining whether or not the collected candidate IDs for the travel tires can be subsequently received in a successive manner and narrowing down the candidate IDs. The travel tire ID designation unit 19 is preferably included, for example, in the tire air pressure monitoring ECU 13. When the candidate IDs are narrowed down to a necessary number, the travel tire ID designation unit 19 designates the IDs as the IDs of the travel tires of the associated vehicle.

The tire valve ID registration system 17 includes a spare tire ID registration function that allows the ID of the spare tire 2e (spare tire ID) to be automatically registered to the TPMS receiver 12. The spare tire ID registration function specifies the ID of the spare tire 2e through the same process as when the IDs of the travel tires are specified and registers the ID to the TPMS receiver 12. It is preferred that the ID determination of the spare tire 2e and the ID determination of the travel tires be synchronously (simultaneously) performed.

The tire valve ID registration system 17 includes a spare tire ID collection unit 20. The spare tire ID collection unit 20 collects the ID of a tire valve 4 that transmits a radio signal Sva satisfying a condition of the spare tire 2e as a candidate ID for the spare tire 2e. The spare tire ID collection unit 20 is preferably included, for example, in the tire air pressure monitoring ECU 13. It is preferred that, for example, when a tire valve 4 transmits a radio signal Sva including still information Dst even though the vehicle speed enables the tire valves 4 to determine that the vehicle is traveling, the spare tire ID collection unit 20 collects the ID of the tire valve 4 as a potential ID for the spare tire 2e in a phase having a certain duration. More specifically, the preferred condition of the spare tire 2e is the tire valve 4 transmits the radio signal Sva including the still information Dst even though the vehicle 1 is traveling (at predetermined speed or higher).

The tire valve ID registration system 17 includes a spare tire ID designation unit 21 that designates the ID of the spare tire 2e by determining whether or not the collected candidate IDs for the spare tire 2e can be subsequently received in a successive manner under the same condition and narrowing down the candidate IDs. The spare tire ID designation unit 21 is preferably included, for example, in the tire air pressure monitoring ECU 13. It is preferred that the spare tire ID designation unit 21 designate the ID of the spare tire 2e by determining whether or not the candidate IDs for the spare tire 2e can be received again under the same condition in a phase having a certain duration and repeating the operation in phase units until the candidate IDs are narrowed down to a necessary number.

The operation of the tire valve ID registration system 17 will now be described with reference to FIGS. 2 to 9.

Tire Valve Operation

Figure 2:
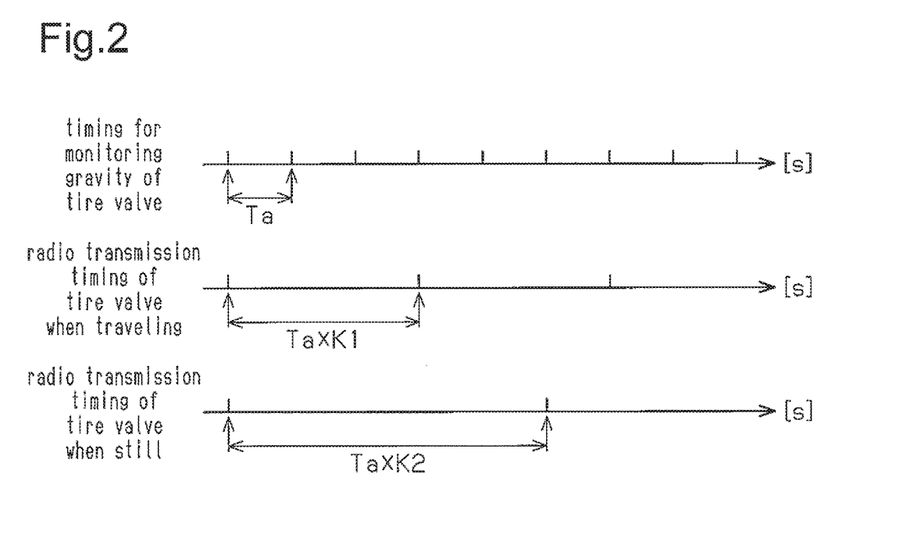
FIG. 2 is a sequence chart showing the operation logic of a gravity detection unit.

FIG. 2 shows the operation logic of the gravity detection unit 9. The gravity detection unit 9 detects the gravity (gravitational acceleration) corresponding to rotation of the tire 2 and detects an acceleration based on centrifugal force generated in the tire valve 4 mainly when the tire is rotated. The tire valve 4 is capable of detecting whether the vehicle 1 is "traveling" or "still" and the rotation speed of the tire 2, that is, the vehicle speed, based on a gravity signal detected by the gravity detection unit 9.

The gravity detection unit 9 repeatedly detects the gravity generated in the tire valve 4 at a fixed monitoring timing. The gravity monitoring interval Ta is preferably, for example, "16 seconds." In the tire valve 4, the gravity monitoring timing conforms to the timing for transmitting a radio signal. When traveling, the transmission interval "Ta× K1," which is obtained by multiplying the gravity monitoring interval Ta and K1, conforms to the timing for transmitting a radio signal. When still, the transmission interval "Ta×K2," which is obtained by multiplying the gravity monitoring interval Ta and K2 (>K1), conforms to the timing for transmitting a radio signal. More specifically, the transmission cycle of the radio signal Sva is set short when traveling, and the transmission cycle of the radio signal Sva is set long when still. The coefficients K1, K2 may be varied in accordance with, for example, the vehicle speed or the time during which the vehicle 1 is still. A state in which the vehicle 1 is "still" includes at least one of "parked" that refers to when the engine is not running and the vehicle 1 is still, "stopped" that refers to when the engine is running but the vehicle 1 is still, and "low speed traveling (e.g., less than 5 km/h)" that refers to when the vehicle 1 is slowly traveling.

Figure 3:
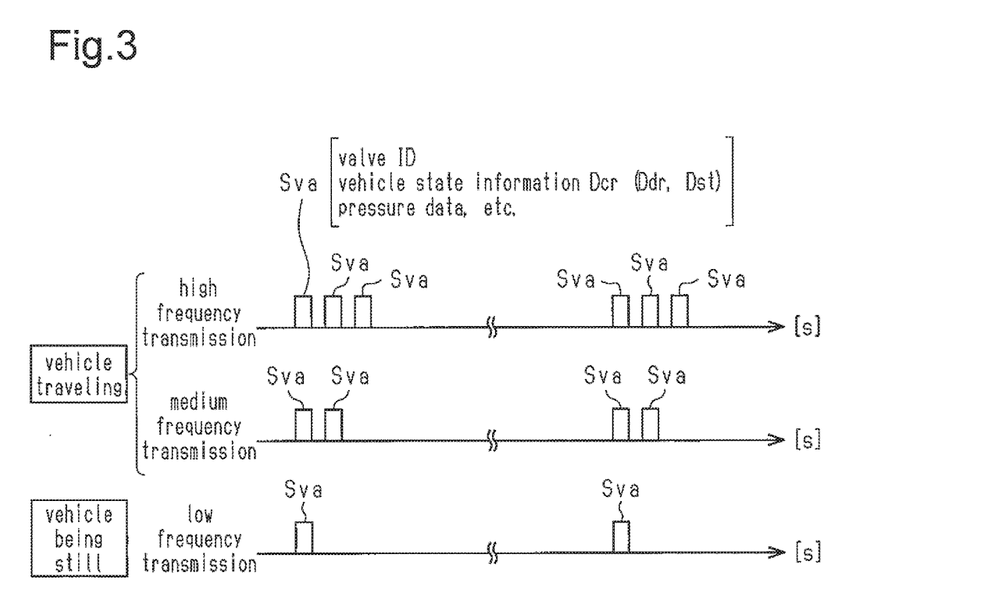
FIG. 3 is a sequence chart showing transmission modes of a tire valve.

FIG. 3 shows a specific example of operation modes that are performed by the tire valve 4. The tire valve 4 preferably performs three modes shown in FIG. 3, namely, "high frequency transmission," "medium frequency transmission," and "low frequency transmission." The high frequency transmission is a mode that is performed if the still time is greater than or equal to a predetermined time when the vehicle shifts from a still state to a traveling state. Further, the number of times the radio signal Sva is transmitted corresponds to "high frequency." The medium frequency transmission is a mode that is performed if the still time is less than the predetermined time when the vehicle shifts from a still state to a traveling state. Further, the number of times the radio signal Sva is transmitted corresponds to "medium frequency." The low frequency transmission is a mode that is performed when the vehicle 1 is still. Further, the number of times the radio signal Sva is transmitted corresponds to "low frequency." For example, when the vehicle 1 frequently repeats a traveling state and a still state, the low frequency transmission and the medium frequency transmission are repeated. When the vehicle 1 starts traveling after being still for a long time, the tire valve 4 is set to the high frequency transmission.

The tire valve 4 transmits a radio signal Sva including vehicle state information Dcr, which is determined based on the gravity signal of the gravity detection unit 9, from the transmission antenna 10. The vehicle state information Dcr indicates the current rotation state of the tire 2. Thus, each radio signal Sva preferably includes, for example, the valve ID, the vehicle state information Dcr, the pressure data, and the like. The vehicle state information Dcr includes, for example, movement information Ddr, which indicates that the vehicle 1 is traveling, and still information Dst, which indicates that the vehicle 1 is still. The movement information Ddr and the still information Dst preferably include, for example, data of several bits. Preferably, the movement information Ddr is a "movement bit," and the still information Dst is a "still bit."

More specifically, the spare tire ID collection unit 20 selects at least one candidate ID for the spare tire from the valves ID of at least one radio signal received by the receiver 12 based on the speed of the vehicle 1 and the vehicle state information Dcr of at least one radio signal Sva received by the receiver 12. The vehicle state information Dcr includes, for example, one of the movement information Ddr, which indicates that the tire corresponding to the vehicle state information Dcr is rotating, and the still information Dst, which indicates that the tire corresponding to the vehicle state information Dcr is still. The spare tire ID collection unit 20 determines whether or not the vehicle 1 is traveling at the predetermined speed or higher. When determining that the vehicle 1 is traveling at the predetermined speed or higher, the spare tire ID collection unit 20 sets the valve ID of the radio signal Sva including the vehicle state information Dcr having the still information to be at least one candidate ID for the spare tire.

Figure 4:
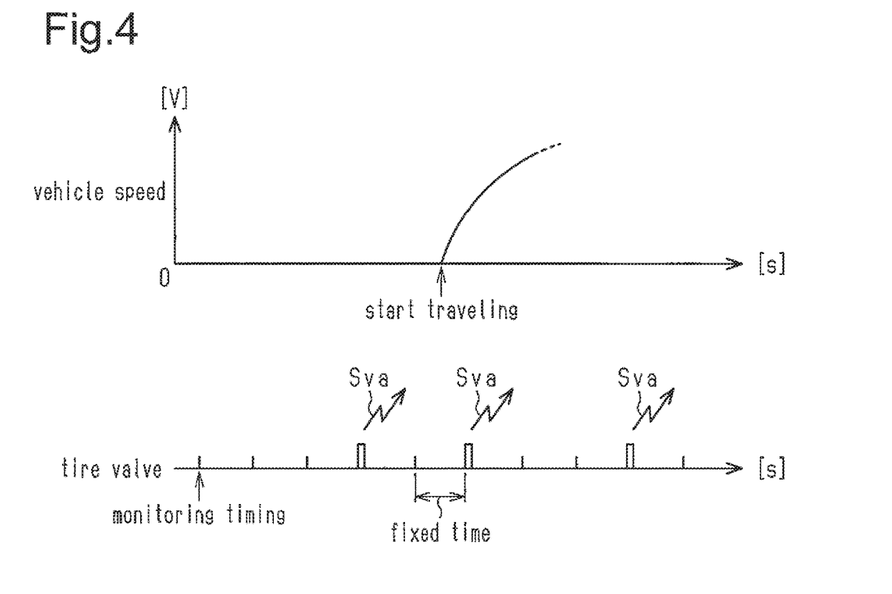
FIG. 4 is a diagram showing the operation performed by the tire valve when the vehicle is shifted from a still state to a traveling state.

FIG. 4 shows the operation performed by the tire valve 4 when the vehicle 1 is shifted from a still state to a traveling state. In this case, at the first gravity monitoring timing after shifted to a traveling state, the tire valve 4 acknowledges that the vehicle 1 is shifted to a traveling state based on change in the output of the gravity detection unit 9. Thus, at the same timing, the tire valve 4 performs transmission of a radio signal Sva. More specifically, when the vehicle 1 is shifted from a still state to a traveling state, the tire valve 4 transmits a radio signal Sva within a fixed time that corresponds to the gravity monitoring interval Ta. In the present example, the timing at which the tire valve 4 transmits a radio signal conforms to the gravity monitoring timing, and the gravity monitoring interval Ta is set to "16 seconds." Thus, when the vehicle 1 is shifted from a still state to a traveling state, the tire valve 4 transmits a radio signal Sva within at least "16 seconds."

Figure 5:
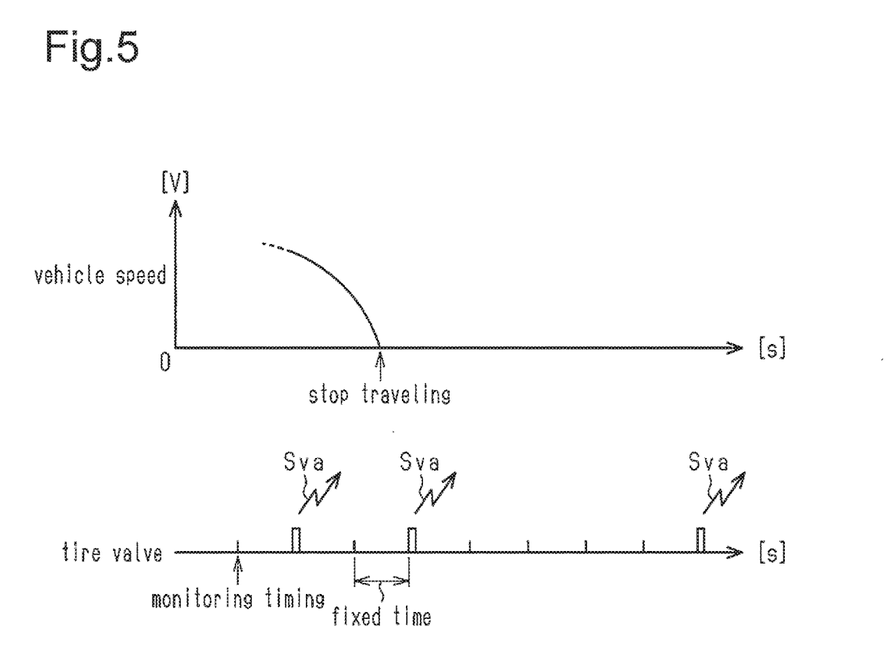
FIG. 5 is a diagram showing the operation performed by the tire valve when the vehicle is shifted from a traveling state to a still state.

FIG. 5 shows the operation performed by the tire valve 4 when the vehicle 1 is shifted from a traveling state to a still state. In this case, at the first gravity monitoring timing after shifted to the still state, the tire valve 4 acknowledges that the vehicle 1 has been shifted to a non-traveling state based on a change in the output of the gravity detection unit 9. Thus, at the same timing, the tire valve 4 performs transmission of a radio signal Sva. More specifically, when the vehicle 1 is shifted from a traveling state to a still state, the tire valve 4 transmits a radio signal Sva within a fixed time that corresponds to the gravity monitoring interval Ta. Also, in this case, the tire valve 4 transmits a radio signal Sva within at least "16 seconds."

Travel Tire ID Registration Operation

Figure 6:
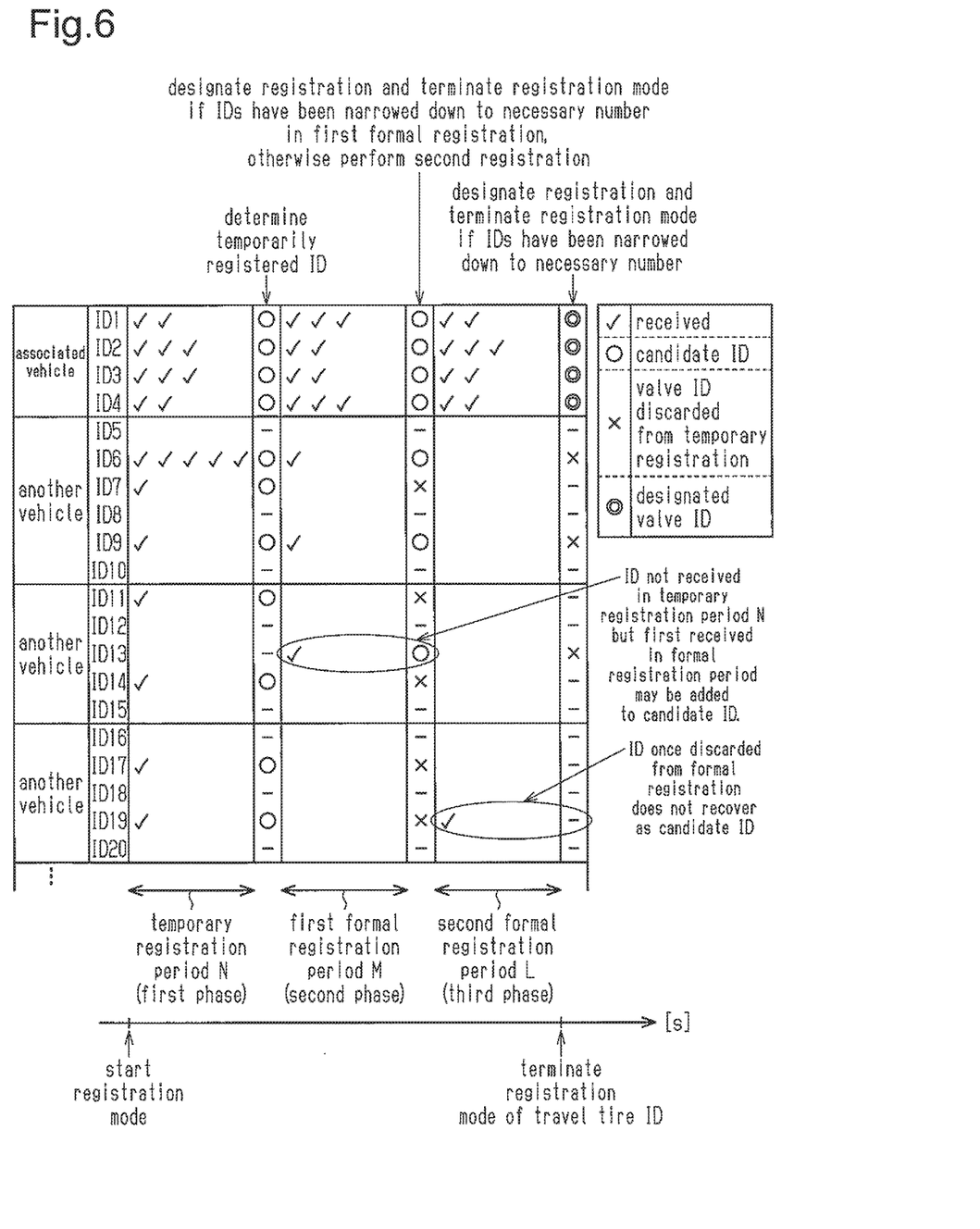
FIG. 6 is a chart showing the operation logic when registering the IDs of travel tires to a receiver.

FIG. 6 shows the operation logic that is performed when the IDs of the travel tires are registered to the TPMS receiver 12. When the registration mode switching operation is performed, the TPMS receiver 12 enters the "registration mode" and starts the valve ID registration operation. In a temporary registration period N having a predetermined duration (two minutes in one example), the travel tire ID collection unit 18 monitors radio signals Sva that are received by the reception antenna 14 of the TPMS receiver 12 and collects the valve IDs. More specifically, the travel tire ID collection unit 18 temporarily registers received valve IDs to the memory 15 of the TPMS receiver 12 in the temporary registration period N, which is the "first phase" of the travel tire ID registration operation. The valve IDs that have become candidates for the travel tires are provided with a "travel tire ID candidate flag" and written to the memory 15. The temporary registration period N is preferably set, for example, to a duration in which a radio signal Sva is theoretically received with certain probability or greater taking into account the rate of receiving radio signals of the tire valve 4.

When receiving a valve ID even only once in the temporary registration period N, the travel tire ID collection unit 18 temporarily registers the valve ID to the memory 15 as a candidate ID for the travel tires. Also, when receiving the same valve ID more than once, the travel tire ID collection unit 18 temporarily registers the valve ID to the memory 15 as a candidate ID for the travel tires.

After the temporary registration is completed, in a formal registration period M having a predetermined duration (two minutes in one example), the travel tire ID designation unit 19 starts to narrow down the candidate IDs. The travel tire ID designation unit 19 determines whether or not the temporarily registered candidate IDs can be received again in the first formal registration period M, which is the "second phase" of the travel tire ID registration operation. More specifically, the travel tire ID designation unit 19 narrows down the candidate IDs by eliminating candidate IDs that are not received again in the first formal registration period M from the temporarily registered candidate IDs. It is preferred that the formal registration period M be set, for example, separately from the temporary registration period N. The valve IDs that have been eliminated from the travel tire registration candidates are kept in the memory 15 and set to a "travel tire ID non-candidate flag." When an ID such as "ID13" is not received in the temporary registration period N and received for the first time in the formal registration period M, the ID may be added to the first formal candidates. If the number of the valve IDs has been reduced to a predetermined number (in one example, four corresponding to travel tires) when the first formal registration period M ends, the travel tire ID designation unit 19 terminates the formal registration operation.

If the number of the valve IDs has not been reduced to the predetermined value (in one example, four corresponding to travel tires) when the first formal registration period M ends, the travel tire ID designation unit 19 again performs the formal registration. More specifically, the travel tire ID designation unit 19 continues the narrowing in the second formal registration period L, which is the "third phase" of the travel tire ID registration operation. When an ID such as "ID19" is eliminated in the first formal registration but received again in the second formal registration, the ID will not recover in the repeated formal registration. The travel tire ID designation unit 19 repeats the phase-unit formal registration until the valve IDs are narrowed down to the predetermined number.

When the candidate IDs are narrowed down to the travel tires of the predetermined number (in one example, four corresponding to travel tires), the travel tire ID designation unit 19 writes the valve IDs to the memory 15 as the "travel tire IDs" and updates the valve IDs registered to the TPMS receiver 12. The TPMS receiver 12 preferably performs the travel tire ID registration operation, for example, whenever the ignition switch of the vehicle 1 is switched ON and the vehicle 1 starts traveling.

Spare Tire ID Registration Operation

Figure 7:
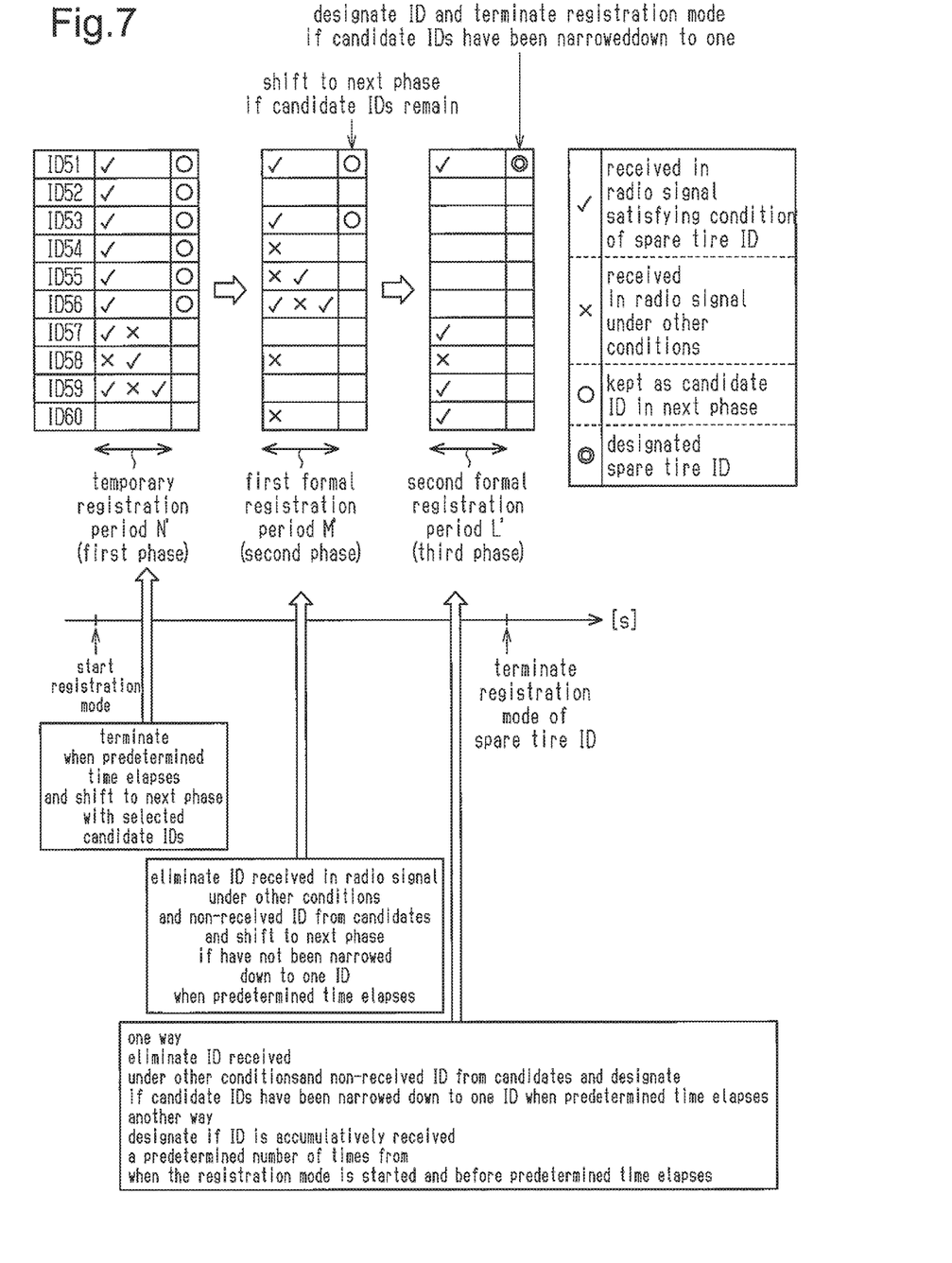
FIG. 7 is a chart showing the operation logic when registering the ID of a spare tire to the receiver.

FIG. 7 shows the operation logic that is performed when the ID of the spare tire 2e is registered to the TPMS receiver 12. It is preferred that the ID registration operation of the spare tire 2e and the ID registration operation of the travel tires be, for example, synchronously performed. Alternatively, the ID registration operation of the spare tire 2e and the ID registration operation of the travel tires may be performed in different periods.

In a temporary registration period N' (several minutes in one example), which is the "first phase" of the ID determination of the spare tire 2e, the spare tire ID collection unit 20 selects valve IDs of the radio signals Sva including the movement information Ddr of the "still bit" from the valve IDs that are received when the vehicle body 5 determines that the vehicle 1 is traveling based on obtained vehicle speed information Sv. The spare tire ID collection unit 20 temporarily registers the valve IDs as "candidate IDs for the spare tire 2e." The spare tire 2e constantly transmits a radio signal Sva having the "still bit" regardless of whether the vehicle 1 is traveling or still. This is used to determine the ID of the spare tire 2e. The registration candidate IDs for the spare tire 2e are set to a "spare tire ID candidate flag," and the IDs are written to the memory 15. The temporary registration period N' for the spare tire 2e may conform to the travel tire temporary registration period N or may be set separately.

The vehicle speed information Sv is preferably, for example, vehicle speed data that is regularly obtained from another in-vehicle ECU such as a meter ECU or the like. Alternatively, the vehicle speed information Sv may be a pulse signal that is output from an axle rotation detection unit 23 capable of detecting the rotation position (rotation amount) of the axle 22. The axle rotation detection unit 23 is preferably, for example, an antilock brake system (ABS) sensor included in each axle. In this case, the TPMS receiver 12 determines the vehicle speed by determining change in the pulse count of the pulse signal (change amount per unit time).

Figure 8:
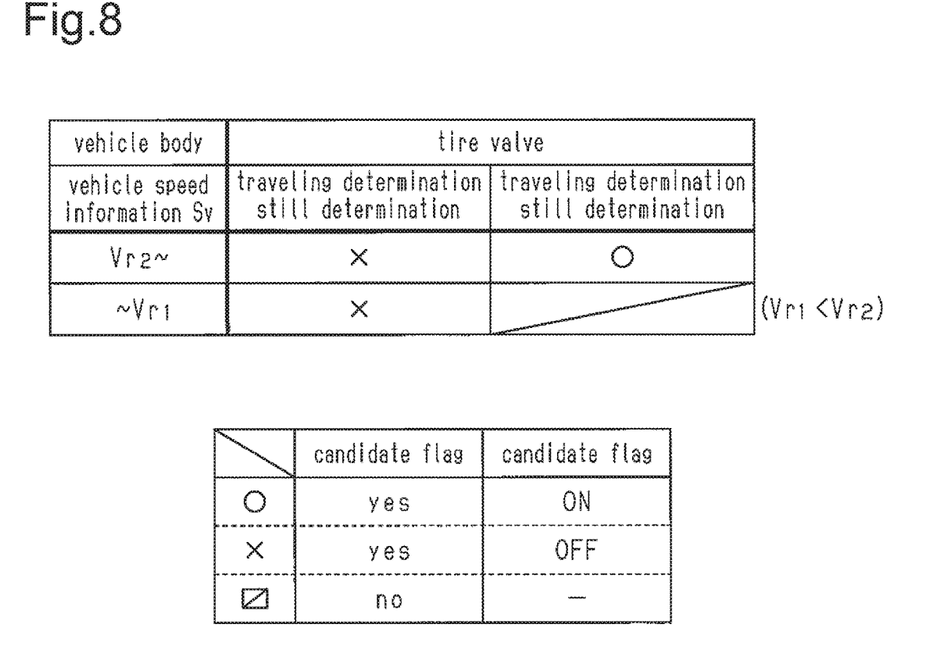
FIG. 8 includes tables showing conditions for determining the ID of the spare tire.

As shown in FIG. 8, it is preferred that a valve ID of a radio signal Sva, which is received when the vehicle body 5 determines that the vehicle speed information Sv is greater than or equal to a set speed Vr2 (in one example, approximately 30 km/h) and has the still bit, be set to the flag for a candidate of the spare tire 2e. The traveling determination of the tire valve 4 is unstable at a low speed. Thus, only the valve ID having the still bit when the vehicle body 5 determines the speed is greater than or equal to the set speed Vr2 is obtained as a candidate ID. This ensures the accuracy. Therefore, if a valve ID having the still bit is received when the vehicle speed is less than Vr2, the valve ID is not obtained as a candidate for the spare tire 2e.

As shown in FIG. 7, even when valve IDs such as "ID57," "ID58," and "ID59" are obtained as candidates for the spare tire 2e, once a radio signal having the "movement bit" is received in the temporary registration period N', the ID may be eliminated from the candidate IDs for the spare tire 2e. The ID that has been eliminated from the candidates for the spare tire 2e is kept in the memory 15 and set to a "spare tire ID non-candidate flag" to be eliminated from the candidates.

After the temporary registration is completed, in a formal registration period M' (in one example, several minutes) having a predetermined duration, the spare tire ID designation unit 21 starts to narrow down the candidate IDs. In the first formal registration period M', which is the "second phase" of the ID determination of the spare tire 2e, the spare tire ID designation unit 21 determines whether or not the temporarily registered candidate IDs for the spare tire 2e can be received again under the same condition as that of the temporary registration. More specifically, in the first formal registration period M', the spare tire ID designation unit 21 narrows down the candidate IDs by eliminating IDs that have not been received again under the same condition as that of the temporary registration. Here, the same condition refers to when the TPMS receiver 12 is able to receive a valve ID having the "still bit" when determined that the vehicle 1 is traveling. The first formal registration period M' of the spare tire 2e may conform to the first formal registration period M or may be set separately from the first formal registration period M.

The valve ID eliminated from the candidates includes an ID (in one example, "ID54") that is received again in a radio signal including the "movement bit." Also, the valve ID eliminated from the candidates includes an ID (e.g., "ID52") that could not be received in the first formal registration period M'. Even when IDs such as "ID55" and "ID56" shown in FIG. 7 are obtained as candidates for the spare tire 2e, once a radio signal including the "movement bit" is received in the formal registration period M', the spare tire ID designation unit 21 may eliminate the ID from the candidate IDs for the spare tire 2e. It is preferred that when an ID such as "ID60" is not received in the temporary registration period N' and received for the first time in the formal registration period M', the ID be eliminated from the formal candidates regardless of whether or not the reception condition imposed on the temporary registration is satisfied.

The valve ID that has been eliminated from the registration candidates for the spare tire 2e is kept in the memory 15 and set to the "spare tire ID non-candidate flag" to be eliminated from the candidates. If the number of the valve IDs has been narrowed down to a predetermined number (one wheel) when the first formal registration period M' ends, the spare tire ID designation unit 21 terminates the formal registration operation.

In the first formal registration period M' (second phase), the reception state for each valve ID may be monitored. When an ID cannot be received for a fixed time or longer or a predetermined number of times or more taking into consideration the transmission cycle of the tire valve 4, the ID may be eliminated as an ID for another vehicle. In this case, the valve ID may be designated in the two phases, which are the first phase and the second phase.

If the number of the valve IDs has not been narrowed down to the predetermined number when the first formal registration period M' ends, the spare tire ID designation unit 21 again performs the formal registration. More specifically, the spare tire ID designation unit 21 continues the narrowing in the second formal registration period L', which is the "third phase" of the ID determination of the spare tire 2e. It is preferred that a valve ID that is newly received in the third phase not be a candidate for the formal registration. The spare tire ID designation unit 21 repeats the phase-unit formal registration until the valve IDs are narrowed down to the predetermined number.

There are two ways to designate the candidate ID. One way is to eliminate valve IDs in radio signals received under a condition other than the above condition and a non-received valve IDs from the candidates for the spare tire 2e. If the candidate IDs have been narrowed down to one ID when the predetermined time (formal registration period L') elapses, the ID of the spare tire 2e is designated. Another way is to designate a valve ID as the ID of the spare tire 2e when the valve ID is accumulatively received a predetermined number of times from when the registration mode is started and, for example, before a predetermined time elapses.

When the candidate IDs are narrowed down to the predetermined number of the spare tires 2e, the spare tire ID designation unit 21 writes the valve ID to the memory 15 as the "ID of the spare tire 2e" and updates the valve IDs registered to the TPMS receiver 12. When the ID determination of the spare tire 2e cannot be terminated within the limited time, the spare tire ID designation unit 21 forcibly terminates the ID determination operation of the spare tire 2e. When the travel tire ID designation unit 19 cannot terminate the travel tire ID determination within the limited time and forcibly terminates the travel tire ID determination, the spare tire ID designation unit 21 forcibly terminates the ID determination of the spare tire 2e, accordingly.

Figure 9:
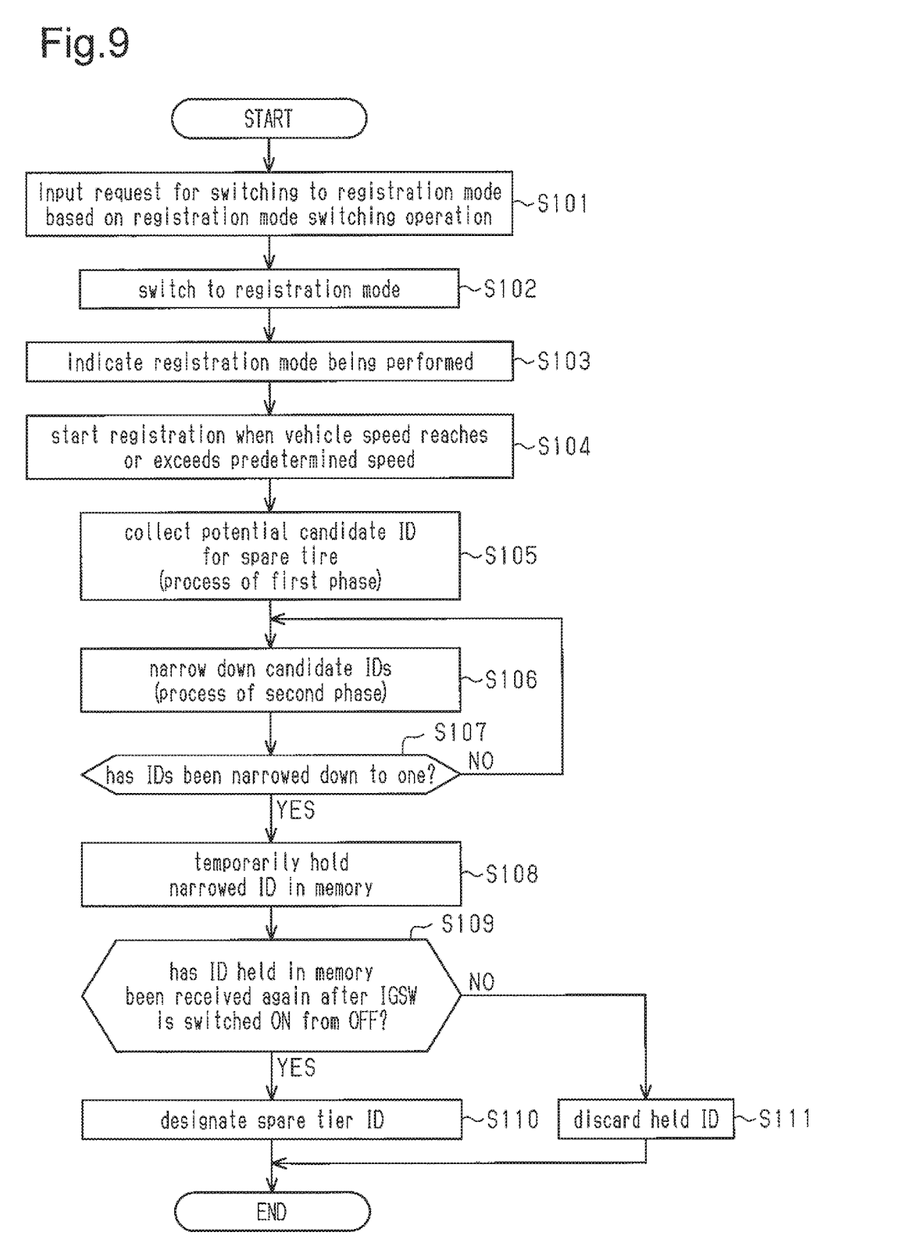
FIG. 9 is a flowchart showing the sequence for registering the ID of the spare tire to the receiver.

The overall sequence of the ID registration operation of the spare tire 2e will now be described in accordance with the flowchart.

As shown in FIG. 9, in step 101, when the registration mode switching operation is performed on the TPMS receiver 12, the TPMS receiver 12 receives a registration mode switching request. The registration mode switching operation includes, for example, operation performed by pressing a trigger switch located on the TPMS receiver 12 a number of times.

In step 102, when receiving the registration mode switching request, the TPMS receiver 12 switches the operation mode of the TPMS receiver 12 to the registration mode.

In step 103, the TPMS receiver 12 indicates, on the display 16, that the operation mode is switched to the registration mode, that is, the registration mode has been started. The registration mode being performed is indicated, for example, by blinking an indicator of the display 16 or the like.

In step 104, in the registration mode, the TPMS receiver 12 monitors the vehicle speed based on the vehicle speed information Sv obtained from another in-vehicle ECU, various sensors, or the like. When the vehicle speed reaches or exceeds the predetermined speed (e.g., 5 km/h), the TPMS receiver 12 starts the ID registration operation of the spare tire 2e.

In step 105, the spare tire ID collection unit 20 performs the temporary registration process (process of temporary registration period N') to collect potential candidate IDs of the spare tire 2e. More specifically, in the temporary registration period N', the spare tire ID collection unit 20 collects a radio signal Sva of a valve ID including the "still bit" when the vehicle speed is determined to be greater than or equal to the set value Vr2 based on the vehicle speed information Sv.

In step 106, the spare tire ID designation unit 21 performs the process of the formal registration (formal registration periods M', L') to select a particular ID from the candidate IDs as the ID of the spare tire 2e. More specifically, the spare tire ID designation unit 21 performs the formal registration operation, which obtains valve IDs based on the same determination as the first phase, to narrow down the candidate IDs to one particular ID in the second and subsequent phases.

In step 107, the spare tire ID designation unit 21 determines whether or not the valve IDs have been narrowed down to one. If the valve IDs have not been narrowed down to one, in step 106, the spare tire ID designation unit 21 continues the narrowing. If the valve IDs have been narrowed down to one, step 108 is performed.

In step 108, the spare tire ID designation unit 21 temporarily designates the valve ID, which has been narrowed down to one, as the potential ID of the spare tire 2e to the memory 15.

In step 109, after the ignition switch is switched OFF and then again switched ON, the spare tire ID designation unit 21 determines whether or not the temporarily designated valve ID, which is held in the memory 15, can be received again in the predetermined time. The spare tire ID designation unit 21 determines the vehicle power supply state based on an ignition signal Sig provided from the ignition switch. When the valve ID is received again, step 110 is performed. When the valve ID cannot be received again, step 111 is performed.

In step 110, the spare tire ID designation unit 21 formally designates the valve ID that has been temporarily designated in the memory 15 as the ID of the spare tire 2e of the associated vehicle.

In step 111, the spare tire ID designation unit 21 discards the valve ID from the memory 15. Then, the flow is forcibly terminated and waits until the next ID registration of the spare tire 2e is started.

Even after the travel tire IDs are designated by the travel tire ID designation unit 19, the spare tire ID designation unit 21 continues to narrow down the IDs for the spare tire 2e until the ID of the spare tire 2e is specified. More specifically, even when the travel tire ID designation is completed and the blinking of the indicator on the display 16 is put off, the ID determination of the spare tire 2e continues in the background, which is not recognized by the user. When the ID determination of the spare tire 2e cannot be completed within the limited time, the spare tire ID designation unit 21 does not provides the user with further notification or the like and just terminates the process.

The configuration of the present embodiment has the advantages described below.

(1) In a temporary registration period N', when a radio signal Sva is received under a condition that allows for determination that the radio signal Sva was transmitted from the spare tire 2e, the spare tire ID collection unit 20 collects the valve ID included in the radio signal Sva as a candidate ID for the spare tire 2e. Through the phase repetition of the subsequent formal registration periods M', L', ..., the spare tire ID designation unit 21 designates a particular valve ID as the ID of the spare tire 2e by narrowing down the collected candidate IDs to the valve ID that has been successively received under the condition that allows determination that the radio signal Sva was transmitted from the spare tire 2e. This achieves the easy registration of the ID of the spare tire 2e in the TPMS receiver 12 without using a registration tool.

(2) The condition for determining whether or not a received ID is the ID of the spare tire 2e is that the tire valve 4 transmits a radio signal Sva including the still information Dst even through the vehicle 1 is traveling. Whether or not the valve ID is the ID of the spare tire 2e is determined based on the still information Dst, which is actually included in the radio signal Sva. This is further advantageous for accurately specifying a potential valve ID for the spare tire 2e.

(3) The spare tire ID designation unit 21 designates the ID of the spare tire 2e by narrowing down the valve IDs through the phase repetition. Thus, even when the ID of the spare tire 2e cannot be specified in one phase, a particular valve ID can be determined to be the ID of the spare tire 2e through the phase repetition.

(4) Even when candidate IDs are narrowed down to valve IDs of the predetermined number as the ID of the spare tire 2e, the spare tire ID designation unit 21 temporarily designates the valve ID. If the temporarily designated valve ID is received when the ignition switch is switched ON from OFF, the spare tire ID designation unit 21 formally designates the valve ID as the ID of the spare tire 2e. This is further advantageous for accurately specifying the ID of the spare tire 2e.

(5) When the ID determination of the spare tire 2e cannot be terminated within the limited time, the spare tire ID designation unit 21 forcibly terminates the ID determination operation of the spare tire 2e. Thus, when the ID of the spare tire 2e cannot be designated for a while, for example, due to traffic jam or the like, the registration may be terminated in a certain time. Thus, the ID of the spare tire 2e is efficiently registered.

(6) Even when an ID is temporarily held as a candidate ID for the spare tire 2e in the temporary registration period N', the spare tire ID collection unit 20 eliminates the ID from the candidate ID if the ID is received in a radio signal Sva under a condition other than a condition that allows for determination that the radio signal Sva was received from the spare tire 2e. This allows for accurate collection of a candidate ID for the spare tire 2e and shortens time needed to designate the ID of the spare tire 2e.

(7) The ID registration operation of the travel tires and the ID registration operation of the spare tire 2e are synchronously performed. Thus, the IDs are efficiently designated.

(8) Even after the travel tire ID designation is completed, the spare tire ID designation unit 21 continues to narrow down the IDs for the spare tire 2e until the ID of the spare tire 2e is specified. Thus, even when the ID designation of the travel tires is completed, the ID determination of the spare tire 2e may be continued. The ID determination of the spare tire 2e may take time. This is further advantageous for accurately determining the ID of the spare tire 2e.

(9) When the travel tire ID designation unit 19 cannot terminate the travel tire ID determination within the limited time, the travel tire ID registration operation is forcibly terminated. Accordingly, the spare tire ID designation unit 21 forcibly terminates the ID determination of the spare tire 2e. When the travel tire IDs cannot be designated for a while, for example, due to traffic jam or the like, it is assumed that the ID of the spare tire 2e also cannot be immediately designated. Therefore, when the travel tire ID cannot be designated within the limited time and the travel tire ID determination is terminated, the ID determination of the spare tire 2e is also terminated. Thus, the ID of the spare tire 2e is efficiently registered.

The embodiment is not limited to the above configuration and may be modified as follows.

An interruption period in which the valve ID determination is temporarily interrupted may be arranged between phases. The setting of the interruption period includes, for example, three examples (I), (II), (III), which are described below.

(I) Accumulation time is measured when the vehicle is traveling at a predetermined vehicle speed or higher. The registration operation is interrupted until the accumulation time reaches or exceeds a predetermined value.

(II) Time elapsed from when a phase ends is measured with a timer. The registration operation is interrupted when the time set for the timer runs out.

(III) A count value is measured with a counter that changes count modes in accordance with the vehicle speed. The registration operation is interrupted until the counter value reaches or exceeds a predetermined value.

If the interruption period is arranged between phases in the above manner, when the ID of the spare tire 2e cannot be designated for a while, for example, due to traffic jam or the like, the ID determination of the spare tire 2e may be interrupted and then performed in a different period that is free from the traffic jam. This is advantageous for efficiently determining the ID of the spare tire 2e.

Various means may be directly or indirectly used as the trigger for switching the TPMS receiver 12 to the registration mode.

The first phase (temporary registration period N') of the spare tire determination may be temporally controlled and, for example, terminated in a predetermined time using a timer.

The first phase (temporary registration period N') of the spare tire determination may have a variable phase time in accordance with various traveling conditions and, for example, have the first phase time at 0 to 10 km/h and the second phase time at 10 to 20 km/h.

The first phase (temporary registration period N') of the spare tire determination may be terminated, for example, when the total number of the candidate IDs reaches a predetermined number.

The first phase and the second phase are not limited to separate phases and may be set in a single process period. More specifically, when a valve ID is obtained as a candidate ID for the spare tire 2e and the ID is received again in the same phase, the candidate IDs may be narrowed down.

When narrowing down in the formal registration, for example, a predetermined period may be set. In the predetermined period, when a valve ID is received in a radio signal Sva that does not satisfy the condition of the spare tire 2e, the valve ID may be eliminated from the candidate. More specifically, the narrowing is not performed based on a valve ID received in a radio signal that satisfies the condition of the spare tire 2e. Thus, such valve ID does not have to be received. Instead, only a valve ID received in a radio signal Sva that does not satisfy the condition of the spare tire 2e may be eliminated from the candidate.

The process of the formal registration is not limited to the process for narrowing down the candidate IDs through the phase repetition. For example, a valve ID that is first received a predetermined number of times in one phase may be formally designated as the ID of the spare tire 2e.

In the process of the formal registration, for example, when the IDs for the spare tire 2e are narrowed down to one ID and then the one ID is received a predetermined number of times, the ID may be designated as the ID of the spare tire 2e.

The ID of the spare tire 2e may be designated when the ID is received again a number of times after the ignition switch is switched ON from OFF.

The transmission frequency of the tire valve 4 is changed between when the vehicle is traveling and still. Thus, the TPMS receiver 12 may determine that a radio signal Sva is transmitted from the spare tire 2e when the transmission frequency of the radio signal Sva is equivalent to the low transmission frequency.

The tire valve 4 may change the transmission interval of the radio signal Sva for each transmission mode. For example, transmission interval of radio signals Sva may be shortened in the high frequency transmission and extended in the medium frequency transmission.

The spare tire 2e may include two or more spare tires.

The ID registration operation of the travel tires and the ID registration operation of the spare tire 2e do not have to be synchronously performed and may be performed in different periods.

Radio signals Sva transmitted a number of times in the high frequency transmission or the medium frequency transmission are not limited to those all-having the same signal contents and may be changed. For example, the first radio signal Sva and the second and subsequent radio signals Sva may have different signal information.

When the ID of the spare tire is designated, the display 16 may indicate the designation.

The invention claimed is:

1. A tire valve ID registration system that includes a plurality of tire valves respectively coupled to a plurality of tires and a spare tire and configured to transmit a radio signal including tire air pressure data and a valve ID, and a receiver arranged on a vehicle body and configured to receive the radio signal from each of the tire valves, wherein the tire valve ID registration system monitors air pressure of a plurality of tires based on a radio signal transmitted from each of the tire valves and registers the valve IDs of the tire valves to the receiver, the tire valve ID registration system comprising:
  a spare tire ID collection unit configured to collect the valve ID of at least one radio signal received by the receiver under a condition that allows for determination that the radio signal was transmitted from the tire valve of the spare tire as at least one candidate ID for the spare tire; and
  a spare tire ID designation unit configured to designate an ID of the spare tire by determining whether or not the receiver is able to successively receive the same at least one candidate ID for the spare tire, which has been collected by the spare tire ID collection unit, under the condition and narrowing down the at least one candidate ID for the spare tire based on the determination result.

2. The tire valve ID registration system according to claim 1, wherein:
  the condition includes the tire valve transmitting a radio signal including still information when a vehicle is traveling at a speed that enables the tire valves to determine that the vehicle is traveling.

3. The tire valve ID registration system according to claims 1, wherein:
  the spare tire ID designation unit designates the ID of the spare tire by determining whether or not candidate IDs for the spare tire can be received again under the condition in a phase having a certain duration and repeats the operation in phase units until the candidate IDs for the spare tire are narrowed down to a necessary number.

4. The tire valve ID registration system according to claim 1, wherein:
  the spare tire ID designation unit determines whether or not the ID of the designated spare tire has been successively received after an ignition switch of the vehicle is switched ON from OFF;
  when determining that the ID of the designated spare tire has been successively received, the spare tire ID designation unit formally designates the ID of the spare tire; and
  when determining that the ID of the designated spare tire has not been successively received, the spare tire ID designation unit discards the ID of the spare tire.

5. The tire valve ID registration system according to claim 1, wherein:
  when designation of the ID of the spare tire cannot be terminated within a limited time, the spare tire ID designation unit forcibly terminates operation for designating the ID of the spare tire.

6. The tire valve ID registration system according to claim 1, wherein:
  the receiver includes a memory that holds a collected valve ID as a candidate for the ID of the spare tire; and
  when receiving a valve ID, which is held in the memory as the candidate for the ID of the spare tire, in a radio signal that does not satisfy the condition, the spare tire ID collection unit eliminates the valve ID from the candidate for the ID of the spare tire.

7. The tire valve ID registration system according to claim 1, further comprising:
  a travel tire ID collection unit that receives valve IDs respectively transmitted from the tire valves and collects candidates for an ID of a travel tire; and
  a travel tire ID designation unit that specifies the ID of the travel tire by determining whether or not the collected candidates for the ID of the travel tire can be successively received and narrowing down the valve IDs based on the determination result; wherein:
  operation for specifying the ID of the travel tire and operation for specifying the ID of the spare tire are synchronously performed.

8. The tire valve ID registration system according to claim 7, wherein:
  even after the ID of the travel tire has been designated, the spare tire ID designation unit continues to narrow down the ID for the spare tire until the ID of the spare tire is specified.

9. The tire valve ID registration system according to claim 7, wherein:
  when specification of the ID of the travel tire cannot be terminated within a limited time, the travel tire ID designation unit forcibly terminates the specification of the ID of the travel tire; and
  when the travel tire ID designation unit forcibly terminates the specification of the ID of the travel tire, the spare tire ID designation unit forcibly terminates the operation for specifying the ID of the spare tire.

10. The tire valve ID registration system according to claim 1, wherein:
  the radio signal includes vehicle state information related to rotation of the tire corresponding to the radio signal; and
  the spare tire ID collection unit selects at least one candidate ID for the spare tire from the valve ID of at least one radio signal received by the receiver based on a speed of the vehicle and vehicle state information of at least one radio signal received by the receiver.

11. The tire valve ID registration system according to claim 10, wherein:
  each of the tire valves includes a gravity detection unit that detects a gravitational acceleration in accordance with rotation of the tire corresponding to the tire valve; and
  each of the tire valves determines whether or not the tire corresponding to the tire valve is rotating in accordance with the gravitational acceleration detected by the gravity detection unit.

12. The tire valve ID registration system according to claim 10, wherein:
  the vehicle state information includes one of movement information, which indicates that the tire corresponding to the vehicle state information is rotating, and still information, which indicates that the tire corresponding to the vehicle state information is still.

13. The tire valve ID registration system according to claim 12, wherein:
  the spare tire ID collection unit determines whether or not the vehicle is traveling at a predetermined speed or higher; and
  when determining that the vehicle is traveling at the predetermined speed or higher, the spare tire ID collection unit sets the valve ID of a radio signal including the vehicle state information of the still information to the at least one candidate ID for the spare tire.

14. The tire valve ID registration system according to claim 13, wherein:
  the predetermined speed is a speed that enables each of the tire valves to determine whether or not the tire is rotating.

* * * * *

UNITED STATES PATENT AND TRADEMARK OFFICE
CERTIFICATE OF CORRECTION

PATENT NO.       : 10,065,461 B2
APPLICATION NO.  : 15/105911
DATED            : September 4, 2018
INVENTOR(S)      : K. Kitagawa et al.

It is certified that error appears in the above-identified patent and that said Letters Patent is hereby corrected as shown below:

In the Claims

Column 15, Line 25 (Claim 3, Line 2), please change "claims 1" to --claim 1--.

Signed and Sealed this
Twenty-sixth Day of February, 2019

Andrei Iancu
*Director of the United States Patent and Trademark Office*